United States Patent

[11] 3,550,814

| [72] | Inventor | Wolf A. von Lersner<br>Cherry Hill, N.J. |
|---|---|---|
| [21] | Appl. No. | 768,312 |
| [22] | Filed | Oct. 17, 1968 |
| [45] | Patented | Dec. 29, 1970 |
| [73] | Assignee | Campbell Soup Company<br>Camden, N.J.<br>a corporation of New Jersey |

[54] MIXING AND DISPENSING UNIT
17 Claims, 7 Drawing Figs.

[52] U.S. Cl. .................................................. 222/145,
222/444
[51] Int. Cl. ..................................................... B67d 5/60
[50] Field of Search ........................................... 222/145,
275, 442, 444, 395, 76, 105; 103/(Inquired);
141/107, 106, 105

[56] References Cited
UNITED STATES PATENTS

| 1,311,955 | 8/1919 | Edison | 141/105X |
|---|---|---|---|
| 1,527,406 | 2/1925 | Hansen | 141/105X |
| 2,588,483 | 3/1952 | Chapman | 141/105 |
| 2,850,990 | 9/1958 | Rasmusson | 222/145X |
| 2,998,164 | 8/1961 | Clements | 222/275X |
| 3,353,711 | 11/1967 | Biezunski et al. | 222/395X |
| 3,396,871 | 8/1968 | McCann | 222/145 |

Primary Examiner—Samuel F. Coleman
Assistant Examiner—Norman L. Stack, Jr.
Attorney—Howson and Howson ABSTRACT: A mixing and dispensing unit adapted particularly for mixing a metered charge of a diluent such as hot water with a metered charge of a heavy concentrate such as soup mixture, and dispensing the combined ingredients. The unit includes reservoirs for the concentrate and the diluent respectively, and a metering piston for metering the charge of concentrate which is connected to its reservoir through a valve and operates to withdraw a metered charge of concentrate from the reservoir. The valve is also connected to a discharge nozzle so that the piston may operate to dispense the metered charge of concentrate therefrom. During discharge, the charge of diluent is mixed with the concentrate. In one instance, the diluent is introduced in a swirling motion in the discharge nozzle and in a second embodiment, the diluent is sprayed through the piston head. In a modified embodiment, the reservoir of concentrate is mounted on a turntable and operation of the metering piston forces air into the reservoir to replace the concentrate drawn therefrom.

INVENTOR:
WOLF A. VON LERSNER
BY Howson & Howson
ATTYS

PATENTED DEC 29 1970

INVENTOR:
WOLF A. VON LERSNER
BY Howson & Howson
ATTYS.

PATENTED DEC29 1970

INVENTOR:
WOLF A. VON LERSNER
BY
Howson & Howson
ATTYS.

MIXING AND DISPENSING UNIT

The present invention relates to a mixing and dispensing unit operable to combine metered charges of at least two fluent ingredients and to dispense the combined ingredients into a receiver. The invention has particular application to mixing and dispensing soup in individual portions.

Prior to the present invention, in eating establishments serving soup, it has been customary to mix a pot of soup from a large quantity of soup concentrate and a suitable amount of water, and to hold the mixture in heated condition for serving individual portions. Where the demand for soup is slow, the solid ingredients in the soup tend to settle in the bottom of the pot and the liquid content tends to evaporate with the result that the soup is not of a uniform quality. In addition, some ingredients degrade in both flavor and texture when kept at elevated temperatures for extended periods of time, such as 2 hours. To overcome this drawback, soup concentrate has been packaged in individual portions which must be mixed with water and served on demand. In busy periods, the task of opening the individual packages and mixing the soup creates problems, not only with the handling but also with the obtaining of a proper mixture to produce satisfactory quality.

With the foregoing in mind, the present invention provides an improved mixing and dispensing unit which stores the food product in a highly concentrated fluid form and automatically mixes a given measure of the food concentrate with the necessary amount of heated diluent to provide a product of the proper consistency and of the proper temperature for consumption.

U.S. Pat. No. 3,384,268 discloses a mixing and dispensing unit particularly adapted for vending operations. While such a device is satisfactory for vending machines, it is desirable to produce a simplified apparatus which is particularly adapted for use in eating establishments and which may also be accommodated to self-service operation.

More particularly, the present invention provides a simplified mixing and dispensing unit which is operable to provide individual portions of uniformly high quality and which is self-flushing to avoid the presence of residue in the mixing unit which might cause degradation of the product subsequently dispensed.

Another object of the invention is to provide a mixing dispensing unit of improved construction providing precise proportioning of the ingredients, easy cleanability, and low manufacturing costs.

The invention also provides an improved dispenser capable of handling heavy concentrates and other fluent materials which do not have a low viscosity.

All of the objects of the invention are more clearly set forth with reference to the accompanying drawing wherein.

Figure 1:
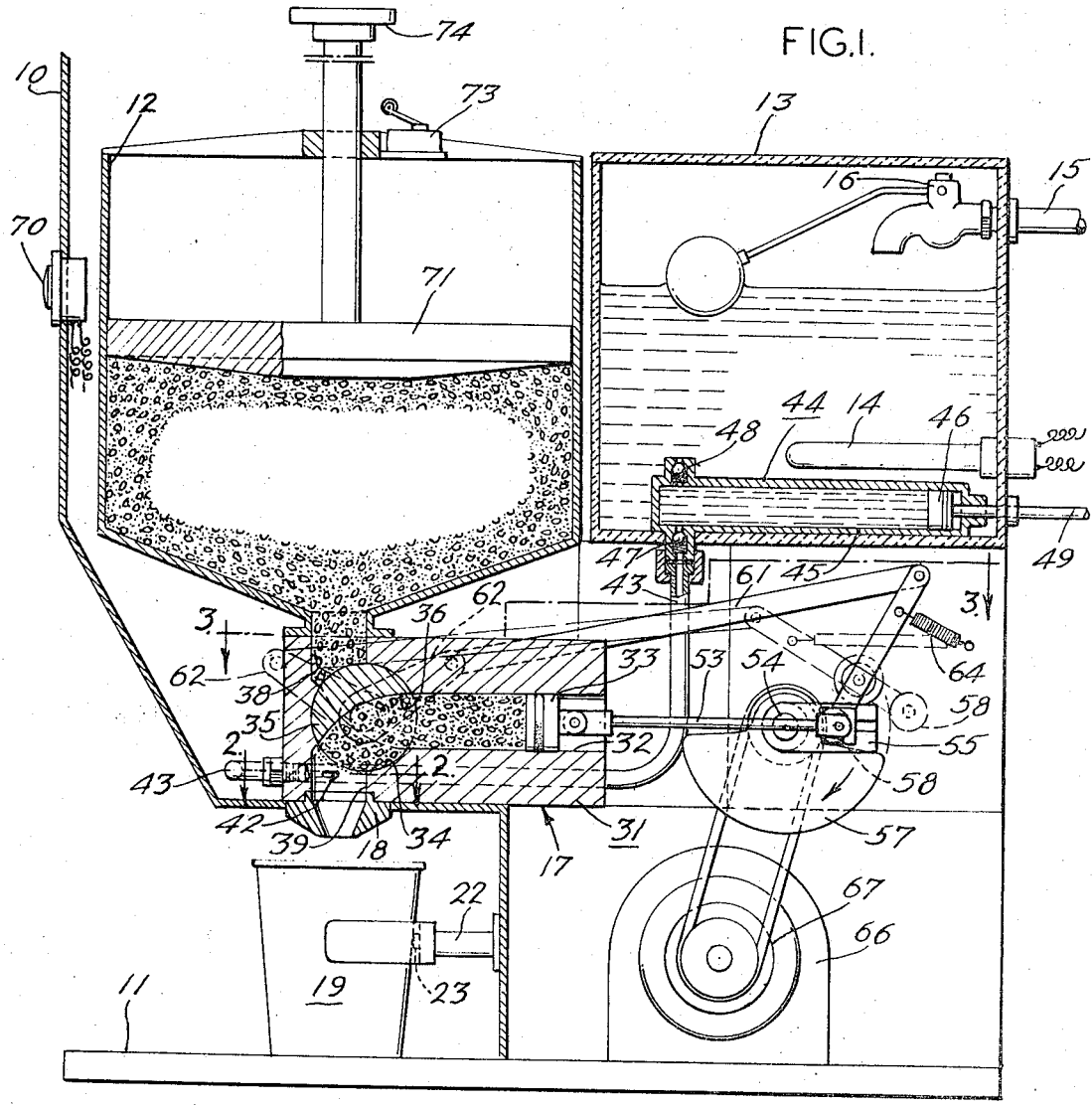
FIG. 1 is a transverse sectional view illustrating a mixing and dispensing unit embodying the present invention.

Referring now to the drawing, and particularly to the embodiment of the invention illustrated in FIGS. 1 to 4 inclusive, the unit comprises a casing 10 adapted to be mounted on a counter 11 or other suitable table top. The unit comprises a first reservoir 12 for the primary ingredient, in the present instance a double-strength soup concentrate, which is maintained at a suitable temperature for the storage of the ingredient without deterioration, and a second reservoir 13 for the storage of the secondary ingredient or diluent, in the present instance hot water. In the present instance, the reservoir 13 is insulated and is provided with an immersion heater 14 for maintaining the temperature of the water at the proper level to insure that when the ingredients are mixed and dispensed, the temperature of the mixture is the proper serving temperature. The reservoir 13 includes a supply line 15 for makeup water which, in the present instance, is controlled by a float-actuated valve 16. The ingredients from the reservoirs 12 and 13 are mixed in a mixing assembly 17 and are adapted to be discharged through a dispensing nozzle 18 into a receptacle 19 supported by the counter top 11. The receptacle 19 is properly positioned under the nozzle 18 by a suitable guide 22 having a safety probe 23 incorporated therein which must be engaged by the receptacle 19 in order to render the unit operative. In operation of the unit, the mixing assembly 17 draws a metered charge of the prime ingredient into the assembly and receives a metered charge of the second ingredient during discharge so as to intermix the ingredients as they are discharged through nozzle 18.

In accordance with the invention, the mixing assembly 17 includes a housing 31 having a cylindrical bore 32 therein in which is mounted a reciprocable piston 33. The head of the bore 32 communicates with a cylindrical valve chamber 34 in which a plug valve element 35 is rotatably mounted. The valve element 35 has a crescent-shaped cavity 36 therein in registry with the bore 32 and adapted to rotate between a first position (see FIG. 4) in registry with an inlet passage 38 and a second position (see FIG. 1) in registry with an outlet passage 39. The chamber 34 is closed on opposite sides of the inlet and outlet by O-rings or other suitable seals (not shown) between the plug valve element 35 and the housing 31 which defined the cylindrical chamber. The inlet 38 is in communication with the reservoir 12 and the outlet 39 communicates with the discharge nozzle 18.

In operation, the piston 33 is retracted from the valve chamber 34 when the valve cavity 36 is in registry with the inlet 38 to charge a metered portion of the prime ingredient into the bore 32. The valve is operated to register its cavity 36 with the outlet 39 and the piston 33 is advanced to discharge the prime ingredient from the bore. In order to obtain proper metering of the primary ingredient, the piston 33 in the bore 32 is driven by a drive rod 53 connected to a drive shaft 54 through an adjustable crank 55. The stroke of the piston which determines the amount of the charge may therefore be regulated by adjusting the crank 55. The shaft 54, in turn, is driven by a drive motor 66 through a single-revolution clutch 67, timed to arrest the shaft 54 upon completion of the discharge stroke of piston 33 prior to the start of a new charging stroke.

Figures 2, 3:
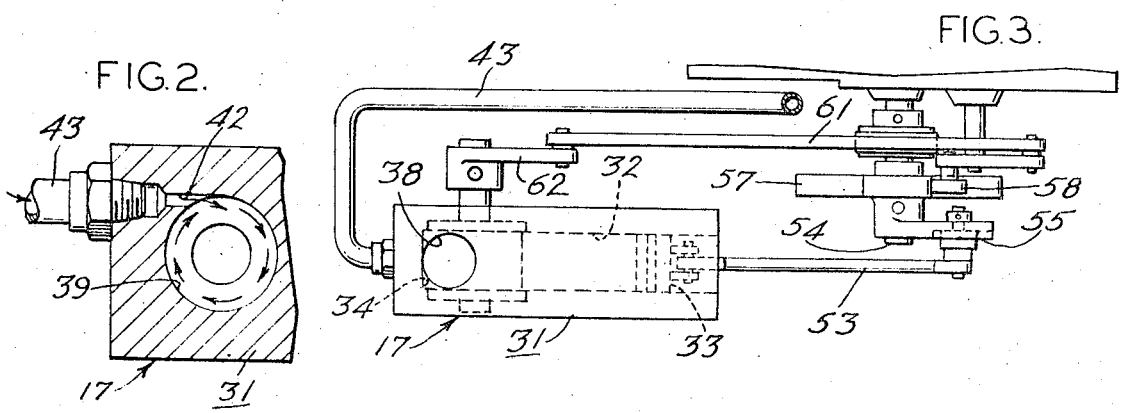
FIG. 2 is an enlarged fragmentary sectional view taken on the line 2–2 of FIG. 1.
FIG. 3 is a sectional view taken on the line 3–3 of FIG. 1.
Figure 4:
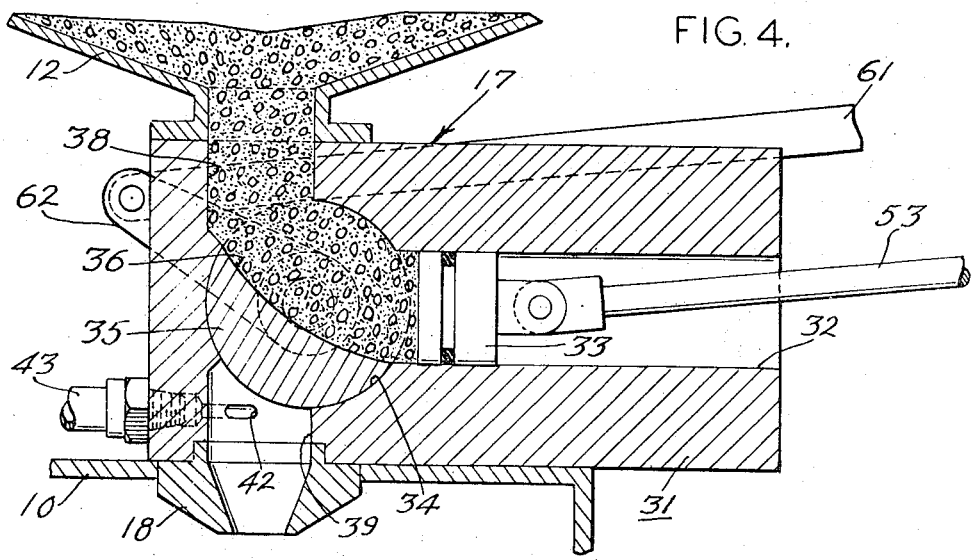
FIG. 4 is a fragmentary sectional view of the apparatus shown in FIG. 1 with the operating parts thereof in different positions.

The secondary ingredient may be added to the primary ingredient during its discharge from the bore or may be injected immediately following discharge of the primary ingredient from the bore. In the present instance, the outlet passage of the housing 31 is provided with an injection port 42 positioned tangentially in the outlet passage 39 as shown in FIG. 2 and connected through a conduit 43 to a metering injector 44 in the reservoir 13. In the present instance, the metering injector 44 comprises a force pump having a cylinder 45, a piston 46, and suitable check valves 47 and 48. The piston 46 is actuated by a rod 49 of suitable control mechanism (not shown) in timed relation to the drive shaft 54 to provide a predeterminable charging stroke which on its forward throw forces a metered quantity of liquid through the valve 47 and conduit 43 into the injection port 42 of the assembly 17.

Connections are provided between the piston and the valve to insure properly timed operation thereof so that the valve is in its first position in registry with the inlet 38 during the charging stroke of the piston and is in its second position in registry with the outlet 39 during the discharging stroke of the piston. To this end, the drive shaft 54 carries a cam 57 having a follower 58 connected through a linkage 61 to an operator 62 for the valve element 35. In FIG. 1, the piston 33 has completed its retractive stroke and the linkage 61 has been displaced from the broken-line position shown in FIG. 1 to the full-line position under the action of the biasing spring 64. The displacement of the linkage 61 to the full-line position shown in FIG. 1 operates the valve to the second position shown therein connecting the bore 32 with the outlet 39. As the drive shaft 54 continues to rotate clockwise under the drive of the motor 66 and single revolution clutch 67, the piston 33 is advanced in the bore 32 to discharge the primary ingredient from the bore through the outlet 39 and discharge nozzle 18. Simultaneously with or immediately following the discharge of the primary ingredient from the bore 32, a metered charge of diluent, in the present case hot water, is injected through the injector port 42 in timed relation to the piston 33 to intermix with the primary ingredient as it is discharged. The tangential arrangement of the injector port 42 imparts a swirling motion to the injected diluent which in conjunction with the configuration of the nozzle 18, which restricts the flow of the primary ingredient from the outlet passage, provides a thorough intermixing of the two ingredients within the outlet 39 as they are discharged. When the piston 33 is advanced to its forward limit position, the single revolution clutch 67 interrupts the drive to the shaft 54, the liquid injector 44 operating to flush any residual material from the outlet 39 and the cavity 36 of the valve.

The unit is at rest with the piston 33 at the forward end of its stroke at the end of the cycle. The next cycle is started, for example, by pressing the start button 70 to trip the single revolution clutch 67 and drive the shaft 54. The cam 57 thereupon throws the linkage 61 to the dotted line position shown in FIG. 1 to position the valve element 35 into the position shown in FIG. 4 wherein the inlet 38 communicates with the bore 32. Rotation of the shaft 54 thereupon retracts the piston 33 to draw the prime ingredient into the bore 32 from the reservoir 12. To assist the charging of the bore 32 because of the thickness of the heavy concentrate used as the primary ingredient, a weighted plunger 71 bears upon the ingredient in the reservoir 12 to insure complete filling of the bore 32 as the piston 33 retracts, the valve 35 being held in its first position by the cam 57. At the end of the discharge stroke of the piston 33, continued rotation of the drive shaft 54 operates the valve 35 by the linkage 61, as described above, and the cycle is completed.

At the completion of the cycle, the single revolution clutch arrests the drive shaft 54 and the unit is in condition for the start of a new cycle.

In order to insure a sufficient supply of the prime ingredient in the reservoir 12 to provide a full serving in the receptacle 19, a limit switch is provided at 73 to be operated by a stop 74 mounted on the plunger 71 when the supply of the prime ingredient in the reservoir 12 is depleted. Actuation of the limit switch 73 prevents tripping of the clutch 67 through suitable connections (not shown). In like manner the absence of a receptacle 19 under the discharge nozzle 18 causes the probe 23 to prevent actuation of the unit. Thus, proper dispensing of a proper mixture into the receptacle 19 is assured.

Figure 5:
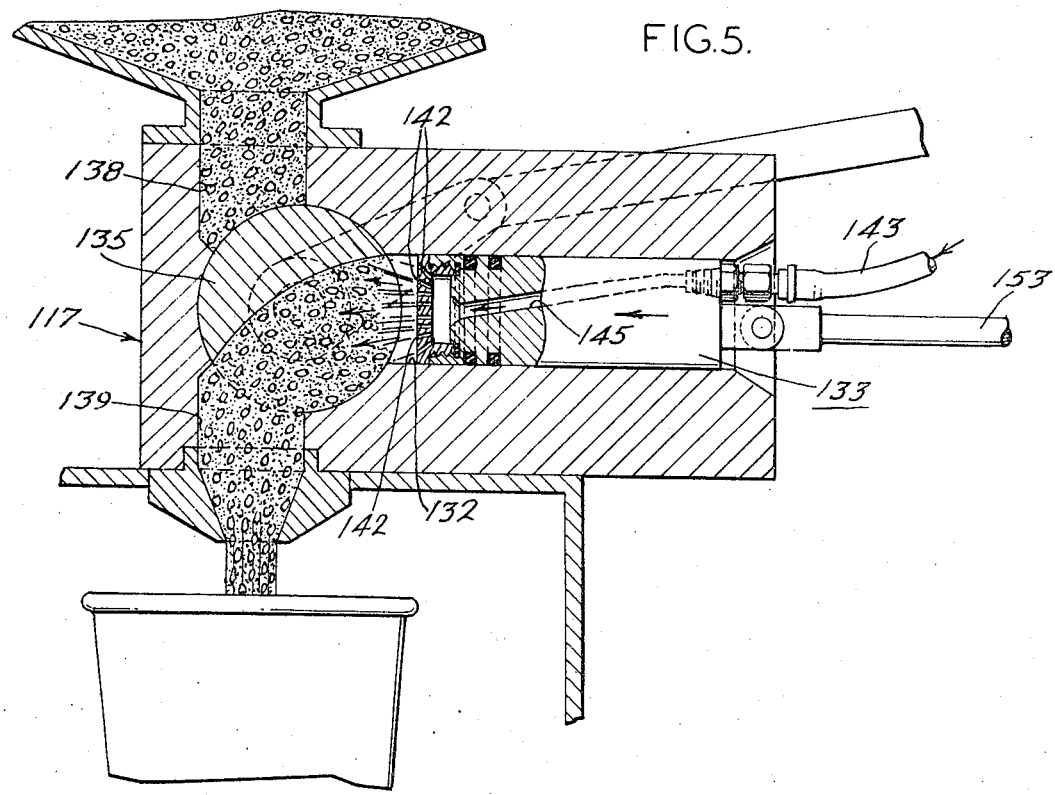
FIG. 5 is a view similar to FIG. 4 showing a modified embodiment of the present invention.

For certain ingredients, it may be desired to provide more thorough flushing of the metering bore for the prime ingredient. In such a case, the water may be injected into the metering bore through the head of the piston rather than injecting the water into the outlet of the mixing assembly. An arrangement of this type is shown in FIG. 5 wherein a mixing assembly 117 is provided with a metering bore 132, an inlet 138 and an outlet 139. A plug valve element 135 is provided to operate in a manner identical to the element 35 described above.

A piston 133 is slidably mounted in the bore 132 for reciprocation by a piston rod 153 in a manner similar to the piston 33 described above. Water is injected into the mixing assembly 117 through injection ports 142 in the head of the piston. The ports 142 are connected to a metering injector through a bore 145 in the piston to which is connected a suitable flexible conduit 143. In other respects the dispensing unit of FIG. 5 is identical to the unit shown in FIGS. 1 through 4 inclusive.

Figure 6:
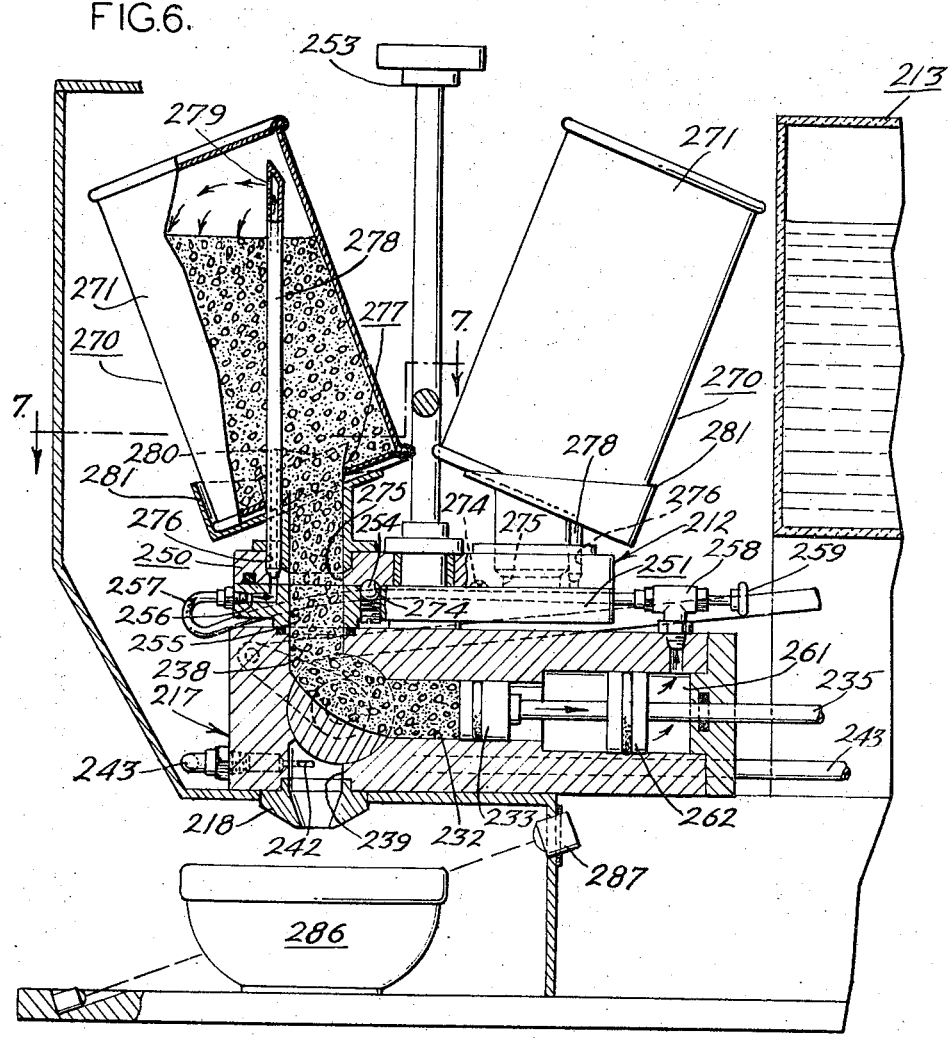
FIG. 6 is a transverse sectional view of another embodiment of a mixing and dispensing unit in accordance with the present invention.
Figure 7:
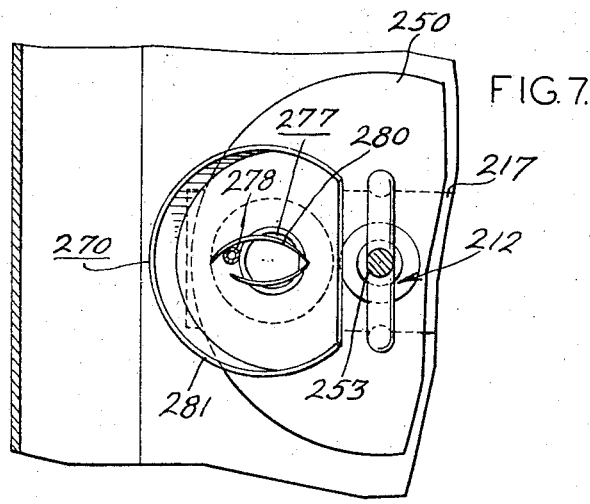
FIG. 7 is a fragmentary sectional view taken along the line 7–7 of FIG. 6 but with the can removed.

FIGS. 6 and 7 illustrate a modified embodiment of the present invention in which plural reservoirs of the prime ingredient are provided along with indexing mechanism to alternatively connect the reservoirs with the mixing apparatus. In this embodiment of the invention, the reservoirs of the prime ingredients are comprises of the standard supply packages for the ingredient, normally standard 50 ounce soup cans. A modified sensing device for the receptacle is provided and means is provided for injecting air into the reservoir to assist in the evacuation of product therefrom.

In this embodiment of the invention, the mixing assembly 217 is similar to the assembly 17 including a metering bore 232 having a metering piston 233 slidable therein, a primary ingredient inlet at 238 and an outlet at 239 having a water injection port at 242 connected to a water reservoir 213, for example by a conduit 243.

The primary ingredient supply means 212 includes a turntable 250 mounted on a support plate 251 for indexing between plural positions, for example by a handle 253. The base plate 251 has a passageway 255 therethrough in registry with the inlet 238 and has an air passage 256 connected to a conduit 257 terminating at its opposite end in a check valve 258 with an operating plunger 259. The valve 258, in turn, is connected to an air chamber 261 disposed concentrically in alignment with the bore 232 and having an air piston 262 therein carried by the operating rod 235 for the piston 233. Therefore, as the piston is retracted, the air piston 262 forces air through the check valve 258 into the air passageway 256. Upon advance of the piston, the check valve 258 permits entry of air into the chamber 261, permitting free advance of the piston.

The turntable 250 has a plurality of reservoir stations 270, each comprising a reservoir in the form of a can 271 of soup concentrate. At each station 270, the turntable includes an ingredient passage 275 which is adapted to register with the passageway 255 of the base plate, and an air passage 276 adapted to register with the air passage 256 of the base plate. Suitable detent means is provided in the base plate 251 at 254 to engage in a socket 274 in the turntable so as to insure proper registry of the turntable with the base plate. A can-opening spout 277 is supported in the passageway 275 and a breather tube 278 is supported in a passageway 276. The spout 277 serves to direct the contents of the can into the passageways 275 and 255 and into the inlet 235.

The spout 277, as shown in FIG. 7, is designed to be forced into a standard can so as to open the same and to support the same on the turntable 250. To this end the spout 277 includes an angularly-inclined upstanding shear blade 280 of substantially oval outline embracing the breather tube 278 at its lower end and flared outwardly at its upper end to facilitate puncturing of the can and to assist in funneling the ingredients into the passageway 277. The blade projects upwardly from a cradle 281 which supports the can 271 in an inclined position over the blade 280. The breather tube 278 extends to the inverted bottom of the can so as to permit air from the chamber 261 to be forced above the contents of the can and thereby assist the discharge of the contents through the spout 277.

The spout assembly 277, including the breather tube 278 the blade 280, and the cradle is readily removable from the turntable to permit to be engaged upon the upper end of a can when the can is standing on a counter. After engagement, the can is inverted and the spout assembly is engaged in the passageway 275. To prevent clogging of the tube 278 during insertion, and to facilitate puncturing of the can by the tube, its upper end is closed with lateral vents being provided at 279 to admit air into the top of the inverted can during operation of the unit.

As shown in FIG. 6, the unit is adapted to dispense the combined ingredients into a receptacle, in the present instance, a bowl 286, underlying a nozzle 218 in the outlet 239. An electric sensing apparatus is provided at 287 to sense the presence or absence of a receptacle 286 under the spout and prevent actuation of the unit in the event of an absence of a receptacle there.

In all of the embodiments, the construction of the mixing assembly is constructed to provide easy and thorough cleaning thereof. The housing may be fabricated from a solid block of material which is resistant to damage by the cleansing agents used and yet is readily machined to the proper tolerances. The intersecting cylindrical bore and cylindrical valve chambers may be machined within close tolerances to provide proper coaction with the piston and valve element respectively. The inlet and outlet passages are likewise susceptible of accurate machining to intersect the valve chamber so as to cooperate with the valve element as required.

While particular embodiments of the present invention have been herein illustrated and described, it is not intended to limit the invention to such disclosure but changes and modifications may be made therein and thereto within the scope of the following claims. For example, the diluent may be injected into the cylindrical bore immediately following the positioning of the valve for discharge and prior to forward movement of the piston in discharge whereby mixing occurs in the bore and the mixed product is partially or entirely forced out by pressure of the diluent.

I claim:

1. Apparatus for mixing and dispensing successive charges of ingredients comprising means to supply at least two ingredients, and a mixing assembly having an outlet passage, a bore, a piston in said bore mounted for longitudinal displacement therein to control the volumetric capacity of said bore, means to displace said piston alternately in a charging stroke and a discharging stroke, valve means operable in one position to connect said bore to said supply means for the first ingredient and in a second position to connect said bore to said outlet passage, means operating said valve in timed relation to said piston displacing means to introduce a charge of the first ingredient from said supply means into said bore during said charging stroke and to exhaust said charge into said outlet passage during said discharging stroke, and means operated in timed relation to said valve after completion of said charging stroke and upon displacement of said valve away from said first position to inject a charge of the second ingredient from said supply means into said assembly under sufficient pressure to intermix with said first ingredient within said assembly, said discharge stroke displacing said piston after displacement of said valve to said second position to discharge said intermixed ingredients from said outlet passage.

2. Apparatus according to claim 1 wherein said mixing assembly includes a housing defining said bore, and said valve means comprises a cylindrical valve chamber in said housing intersecting said bore, a valve element rotatable in said chamber having a cavity in continuous registry with said bore, and an inlet passage connected to the supply means for the first ingredient and intersecting said chamber to register with said cavity when said valve is in its first position so that said cavity interconnects said inlet passage with said bore, said outlet passage being positioned in said housing to intersect said chamber to register with said cavity when said valve is in its second position whereby said cavity interconnects said bore and said outlet passage.

3. Apparatus according to claim 2 wherein said injecting means includes a conduit communicating with said outlet passage to inject said second ingredient into said outlet passage when said passage is interconnected with said bore by said valve element and including nozzle means in said outlet passage to control the discharge of said mixture through said passage.

4. Apparatus according to claim 3 wherein said injecting means includes an injection port in said housing which opens tangentially into said outlet passage and is connected to said conduit to effect a swirling injection of the second ingredient into said passage during discharge of the mixture therethrough.

5. Apparatus according to claim 1 wherein said injecting means includes ports in said piston and connected to said supply means for the second ingredient, and means to force the second ingredient through said ports after displacement of said valve away from its first position.

6. Apparatus according to claim 5 wherein said ports are in the form of a spray head.

7. Apparatus according to claim 1 including control means for the injection of said second ingredient to activate said injecting means following displacement of said valve means away from its first position and to continue said injection following completion of the discharge stroke of said piston whereby said second ingredient flushes the outlet passage after completion of said discharge stroke.

8. Apparatus according to claim 1 including means to adjust the strokes of said piston to thereby regulate the charge of the first ingredient received into said bore.

9. Apparatus according to claim 1 including a main drive shaft, an adjustable crank on said drive shaft connected to said piston-displacing means, a cam on said drive shaft connected to said valve means, and a single-revolution clutch operable when activated to drive said drive shaft to effect said timed operation of said valve and piston respectively to dispense a single portion of the mixture of ingredients through said outlet passage.

10. Apparatus according to claim 9 including means to support a receptacle in a position to receive the mixture discharged through said outlet passage and sensing means operable to prevent activation of said clutch in the absence of a receptacle in said receiving position on said support means.

11. Apparatus according to claim 1 wherein said supply means for the first ingredient includes a reservoir, and including pressure means in said reservoir to press the ingredient into said bore during said charging stroke of the piston.

12. Apparatus according to claim 11 wherein said pressure means comprises a plunger bearing upon the ingredient in said reservoir.

13. Apparatus according to claim 11 wherein said bore is closed at the end remote from said valve and said pressure means includes conduit means leading from the closed end of said bore behind said piston to said reservoir to press air into said reservoir above the ingredient therein, said conduit means including check valve means to direct trapped air from said bore to said supply reservoir during said charging stroke and to direct atmospheric air into said bore during said discharging stroke whereby said trapped air assists the flow of the first ingredient into said bore during said charging stroke.

14. Apparatus according to claim 1 wherein said supply means for the first ingredient comprises an inlet passage to said valve means, a turntable having a plurality of reservoirs thereon, and means to index said turntable to register a selected reservoir with said inlet passage to introduce the ingredient from said selected reservoir into said bore during said charging stroke.

15. Apparatus according to claim 14 wherein said reservoirs comprise separate containers and said turntable includes a spout assembly adapted to engage in and support said containers to afford flow of the ingredient from the selected reservoir container into said inlet passage.

16. Apparatus according to claim 15 wherein said spout assembly is removably mounted in said turntable and includes a cradle portion for supporting one end of the container, and blade means within said cradle portion adapted to penetrate said one end of the container and open it to said inlet passage.

17. Apparatus according to claim 16 including a tube in said spout assembly operable to project through said one end of the container and terminate at the interior of the other end, said tube having vent openings at said other end, said turntable including connections to said tube affording flow of pressure medium therethrough during said charging stroke to assist the flow of ingredient into said bore.